United States Patent
Neff et al.

(12) 
(10) Patent No.: US 6,269,631 B1
(45) Date of Patent: Aug. 7, 2001

(54) PROCESS AND DEVICE FOR OPERATING AN INTERNAL COMBUSTION ENGINE WITH LESS POLLUTANT EMISSION

(75) Inventors: Willi Neff, Kelmis; Klaus Pochner, Aachen; Gerhard Lepperhoff, Stolberg; Georg Lütkemeyer, Würselen, all of (DE)

(73) Assignee: Fraunhofer-Gesellschaft Zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/214,443

(22) PCT Filed: Jul. 1, 1997

(86) PCT No.: PCT/DE97/01373

§ 371 Date: Apr. 14, 1999

§ 102(e) Date: Apr. 14, 1999

(87) PCT Pub. No.: WO98/00630

PCT Pub. Date: Jan. 8, 1998

(30) Foreign Application Priority Data

Jul. 1, 1996 (DE) .............................................. 196 26 381

(51) Int. Cl.$^7$ ..................................................... F01N 3/00
(52) U.S. Cl. ................................. 60/274; 60/275; 60/284
(58) Field of Search .............................. 60/274, 275, 284

(56) References Cited

U.S. PATENT DOCUMENTS

| H1113 | * | 12/1992 | Yoshizaki | ................................ 60/284 |
| 3,751,914 | * | 8/1973 | Pollock | .................................. 60/284 |
| 5,433,832 | * | 7/1995 | Rich et al. | ............................ 204/164 |
| 5,456,063 | * | 10/1995 | Yoshizaki et al. | ...................... 60/284 |
| 5,458,748 | * | 10/1995 | Breault et al. | ......................... 204/177 |
| 5,537,321 | * | 7/1996 | Yoshizaki et al. | ...................... 60/284 |
| 5,732,550 | * | 3/1998 | Muramatsu et al. | ................... 60/284 |
| 5,822,981 | * | 10/1998 | Williamson et al. | .................. 60/275 |
| 5,845,488 | * | 12/1998 | Hancock et al. | ........................ 60/275 |

FOREIGN PATENT DOCUMENTS

| 9202965 | 9/1992 | (DE) . |
| 4231581 | 3/1994 | (DE) . |
| 4423397 | 7/1995 | (DE) . |
| 7-247827 | * 9/1995 | (JP) . |

OTHER PUBLICATIONS

Abstract of Japanese Patent Publication No. 07247827, published Sep. 26, 1995 of Y. Norio et al (one page).

* cited by examiner

*Primary Examiner*—Thomas Denion
*Assistant Examiner*—Thai-Ba Trieu
(74) *Attorney, Agent, or Firm*—Pandiscio & Pandiscio

(57) ABSTRACT

Process and device for operating an internal combustion engine with less pollutant emission, whose exhaust gas is subjected to an electrical aftertreatment during engine operation to convert pollutants, the emissions of which are measured.

To improve a process with the features mentioned initially, so that on the one hand the desired reduction of emissions of the internal combustion engine is achieved during its entire time of operation, but on the other hand so that the design of the electrical system of the internal combustion engine does not have to be unreasonably large and thus costly, the electrical aftertreatment of the exhaust gas occurs only during the portion of the operating time during which emission peaks occur.

16 Claims, 3 Drawing Sheets

PROCESS AND DEVICE FOR OPERATING AN INTERNAL COMBUSTION ENGINE WITH LESS POLLUTANT EMISSION

BACKGROUND OF THE INVENTION

1. Field of the Invention

This invention relates to a process for operating an internal combustion engine with low pollutant emission.

2. Description of the Prior Art

To preserve a livable environment, it is necessary to reduce the pollutant emission of internal combustion engines as much as possible. Increasingly stringent limits are being prescribed by legislation that limit the fraction of pollutants in exhaust gas. In the past, for example, the exhaust gas limits for motor vehicles (automobiles and commercial vehicles) have been cut in half about every 3 to 5 years.

However, in road traffic itself, where rapid changes of speed and load are expected of the engines, great difficulties are confronted in reducing the emission of pollutants without any adverse impact on road performance, or conversely without having to deal with an increase of fuel consumption.

Corresponding to the importance of irregular operation, a running curve is prescribed for measuring the pollutant emission of automobiles that includes running hot after a cold start and some acceleration phases. For commercial vehicles also, replacing the present steady-state 13-point test with a dynamic running curve is foreseen for the future. A stepwise approximation of the test cycles to actual operation will thus be achieved for both types of motor vehicles.

To evaluate a cycle test, samples of the exhaust gases produced during the entire cycle are collected and only the amount of pollutants integrated over time is considered. A large fraction of the pollutant emissions originates from the warmup phase and from non-steady-state operation of the engine.

It has long been known that the chemical energy contained in the exhaust gas can be utilized by installing a noble metal catalyst in the exhaust line to bring about a post-reaction of the pollutants. When the catalyst reaches a minimum temperature, the unburned hydrocarbons, carbon monoxide, and nitrogen oxides in the exhaust gas react to form harmless compounds. This technique has been used since recently in diesel engine vehicles as a so-called oxidation catalyst and achieves an efficiency of about 30–50% for reduction of particulates, HC, and CO.

Such a small pollutant reduction is inadequate in the case of the gasoline engine, so that this catalyst, called unregulated here, has been replaced by a 3-way catalyst with $\lambda$-regulation for about ten years. This can drastically improve pollutant conversion and it achieves an efficiency of far greater than 90%.

During the acceleration phases, however, more fuel would be necessary for ideal operation of the engine, but this would shift the air-to-fuel ratio to values lower than 1 and would lead to poorer catalyst efficiency with regard to HC and CO. Even when the load is eliminated, there is a deviation of the mixture from the ideal point since more fuel is vaporized from the intake manifold walls because of the changed flow in the intake system. The value of $\lambda$ in non-steady-state operation can be kept roughly constant only by complicated measures.

Another drawback of known catalyst technology is the minimum temperature of the catalyst necessary for the chemical reactions to start. Thus, after a cold start of the engine it takes several minutes for the catalyst material to be heated by contact with the hot exhaust gas. Slightly enriching the mixture during this warmup phase can cause the combustion temperatures in the engine to rise, and the exhaust gas becomes hotter and also contains increased chemical energy in the form of unburned hydrocarbons, which in turn heats the catalyst. Drawbacks to this are increased consumption because of the richer mixture and an increase in the untreated concentration of pollutants, which are unfortunately released to the environment practically without exhaust gas aftertreatment, since the catalyst is in fact still inactive.

Since 60–70% of the pollutants emitted over the entire cycle are typically formed in the first 50 seconds of a test cycle, supplementary measures outside the engine are being tested at this time for heating the catalyst. By moving the exhaust gas catalyst close to the engine, the heat energy contained in the exhaust gas can be better utilized. However, there is a risk that the catalyst will be heated too strongly, damaged, or even destroyed under full load.

Mounting heaters in the catalyst is also being investigated. There are burner-heated systems, but there are substantial safety objections against them. Electrically heated systems, on the other hand, require a more generous design of generator and battery. The latter is problematical in particular because the electrical energy is needed at a time when the motor is producing practically no mechanical energy. Both systems have in common the drawback that the heat capacity of the exhaust system has to be overcome, which in every case leads to the fact that the efficacy of exhaust gas purification can start only with some time delay after turning on the engine.

DE-A-42 31 581 discloses a process with the process steps of the preamble of claim 1. Admixtures affecting conversion are carried out and all operating parameters of the plasma chemical reactions that bring about conversion are controlled to maximize pollutant conversion.

JP-A-07247827 discloses how to operate an electrical exhaust gas aftertreatment system in the exhaust system of a diesel internal combustion engine with low exhaust gas temperature prevailing. The aftertreatment system operates during the entire warmup time and is turned off at high exhaust gas temperature.

SUMMARY OF THE INVENTION

The known processes described above occur during continuous operation. Accordingly, the load on the electrical system of the internal combustion engine is high. Compared to this, the underlying purpose of the invention is to improve a process of the type discussed so that on the one hand the desired reduction of emissions of the internal combustion engine is achieved during its entire time of operation, but on the other hand so that the design of the electrical system of the internal combustion engine does not have to be disproportionately large and thus costly.

The invention presupposes turning on an electrical device for aftertreatment of exhaust gas only for each brief time period during the warmup or during a load change of the engine. A device is used in the invention for the aftertreatment of exhaust gas that depends on cold chemical reactions and is therefore fully active immediately after starting. A plasma chemical reaction initiated by an electrical discharge in the exhaust gas meets the mentioned requirements.

Tests with a barrier discharge in which about 5% of the mechanical power delivered instantaneously by the engine is fed in as electrical power show a 30–70% reduction of the $NO_x$ and HC concentrations. It is important in this case for the discharge to be able to be turned on and off quickly at frequencies of several kHz and to deploy its full activity immediately after starting. Even when a completely cold engine is first started up, which even leads to water condensing out in the plasma chemical reactor, the system reaches the same conversion rates.

The invention is explicitly not limited to the use of a barrier discharge for pollutant reduction, although this seems to be especially well suited, but also includes all other techniques that can be switched in quickly and that are active immediately, particularly electrically operated techniques. Other systems that are suitable in principle for the electrical aftertreatment of exhaust gas, for example, operate with electron beams, microwave energy, with corona discharges, or with the barrier discharge already mentioned, and are known from the literature. It is being attempted at this time to reduce the electrical power requirement of these devices to such an extent that continuous operation also becomes economical. The remaining development needed to reach this goal is still very great, however.

In order to further modify the process for the low-pollution operation of an internal combustion engine, the optimal engine operating parameters are set. The increase of pollutant emission by the engine resulting from this is knowingly accepted and is compensated by the electrical aftertreatment in the exhaust line. Naturally, similarly to continuous operation, a reduction of the electrical power requirement of the aftertreatment would be desirable here also. The power requirement for electrical pollutant reduction for each brief period can be satisfied by full utilization of the reduction of consumption by the engine that is effective during the entire time of operation because of optimized operation, so that averaged over time, reductions of pollutant emissions on the one hand and of fuel consumption on the other hand are achieved.

It should be emphasized as another benefit, particularly compared to electrically heated catalysts, that it is sufficient to turn on the electrical discharge when the engine is already running. In this way the storage of electrical energy to operate the gas discharge can be largely dispensed with. To stay below certain pollutant limits, a definite electrical power is necessary that depends on gas throughput and load, among other factors. It is therefore clear that high electrical power has to be expended only when the engine and generator can also make it available. Appropriate regulation of the operating data for the electrical exhaust gas aftertreatment system, which processes the engine electronics data, can be accomplished, for example, by means of stored performance characteristics.

The barrier discharge already mentioned occurs when an alternating electrical voltage of sufficient amplitude is applied to two electrodes, at least one of which is coated with the dielectric barrier for which it is named. The names silent discharge or dielectrically hindered discharge are also sometimes given in the literature for the barrier discharge. The barrier discharge is differentiated from a corona discharge by the fact that an essentially homogeneous electric field is produced by means of smooth electrodes.

There is a narrow gap between the electrodes that is filled with a gas such as air, noble gases, or in the case described here, with exhaust gas from an internal combustion engine, or the gas passes through it parallel to the electrode surfaces. The gas pressure is in the range of atmospheric pressure, but it can also be above or below this, for example between about 100 hPa and 2000 hPa, without fundamentally altering the course of discharge. In any case the pressure that occurs in the exhaust line of an internal combustion engine is caused by flow resistance and engine pressure pulses in the range suitable for barrier discharges.

Many thin streamer channels develop in the discharge gap with each increase of the alternating voltage as soon as the spark field strength of the gas is exceeded. The current flowing through the streamer channels, also called discharge filaments, leads to electrical charging of the surface of the dielectric barrier. Within a few nanoseconds the electrical field applied externally is shielded by the surface charge and the discharge filaments are extinguished. Successive discharge events in each half-wave of the alternating voltage are largely independent of one another when the frequency of the alternating voltage is set between 50 Hz and 400 kHz.

The described temporally transient discharge has two important consequences: On the one hand, the system is already active with the first voltage rise. On the other hand, the duration of each individual discharge is so short that practically all of the energy switched in appears in the form of fast electrons and not in the form of heating of the discharge gas. These electrons again trigger the required cold plasma chemical reactions by striking molecules in the gas and exciting or cleaving them.

The entire system for exhaust gas aftertreatment consists of the plasma chemical reactor, which can be integrated into the exhaust line in lieu of a muffler for example, and an electronic power supply unit. The power supply unit has a power connection for power supply from the generator, a control input from the engine electronics, and a high voltage output for connecting to the reactor.

Because of these few simple interfaces it is also possible to retrofit such a system in old vehicles. Within certain limits with regard to the maximum power consumption, this is possible by installing additional components in the form described; to produce higher pollutant conversion rates it may be necessary in addition to strengthen the generator or the generator and the automobile battery (lead battery), i.e., to replace them with types of higher power and capacity, respectively.

When incorporated in new vehicles, the entire electronic power supply unit or at least the control circuit for the high voltage final stage can alternatively be combined with the known engine electronics system, in one structural unit. In the second case the remaining final stage is extremely compact and consists only of a few mechanically rugged components that can also be combined in one structural unit with the reactor and can be installed as such in place of a muffler. In contrast to the problem of mechanical ruggedness of the final stage is the benefit of a simpler design of the inleads to the reactor: Instead of a high-voltage-resistant cable, only a high-current low-voltage inlead and a few light control lines are necessary.

The bottom diagram of the illustration shows the functional state of a device for the electrical aftertreatment of exhaust gas as a function of time, with the same time scale being chosen as for the top seven diagrams of the Figure. It can be seen from its bottom diagram that the electrical aftertreatment of exhaust gas occurs during the emission peaks, which occur predominantly during the warmup of the engine lasting about 30 seconds and corresponding to the load changes after the warmup, as described above. Accordingly, it is a benefit of the process that the electrical aftertreatment is carried out only when the amounts of pollutants give occasion for it. Therefore, because the process has to be carried out only during the time when predetermined pollutant levels are exceeded, the power and energy to be expended for it are correspondingly limited, so that a correspondingly advantageous design of the electrical system of the internal combustion engine is possible.

Figure 1:
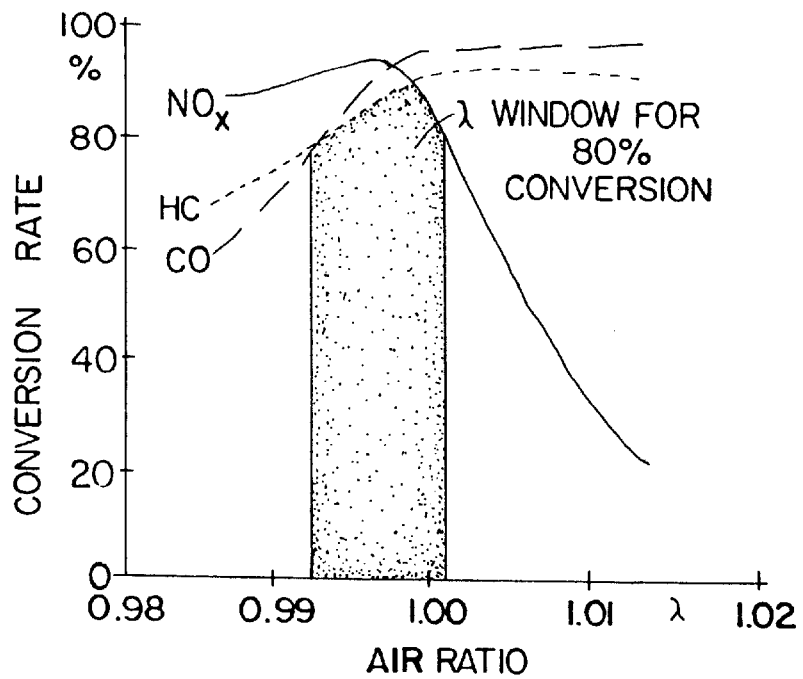
FIG. 1, as an example of limitations of known catalytic technologies for pollutant reduction, shows the conversion rate of a 3-way catalyst as a function of the air-to-fuel ratio $\lambda$. The figure originates from a previous project and shows with hatching the region in which the pollutants CO, HC, and $NO_x$ can be reduced simultaneously by the catalyst by at least 80% compared to their concentrations in the untreated exhaust gas. Modem catalyst systems achieve their best value of about 95% by improved lambda regulation. It is clear from the figure that even small variations in the operating state of the engine that may modify the air-to-fuel ratio have drastic adverse effects on the efficiency of exhaust gas aftertreatment.
Figure 2:
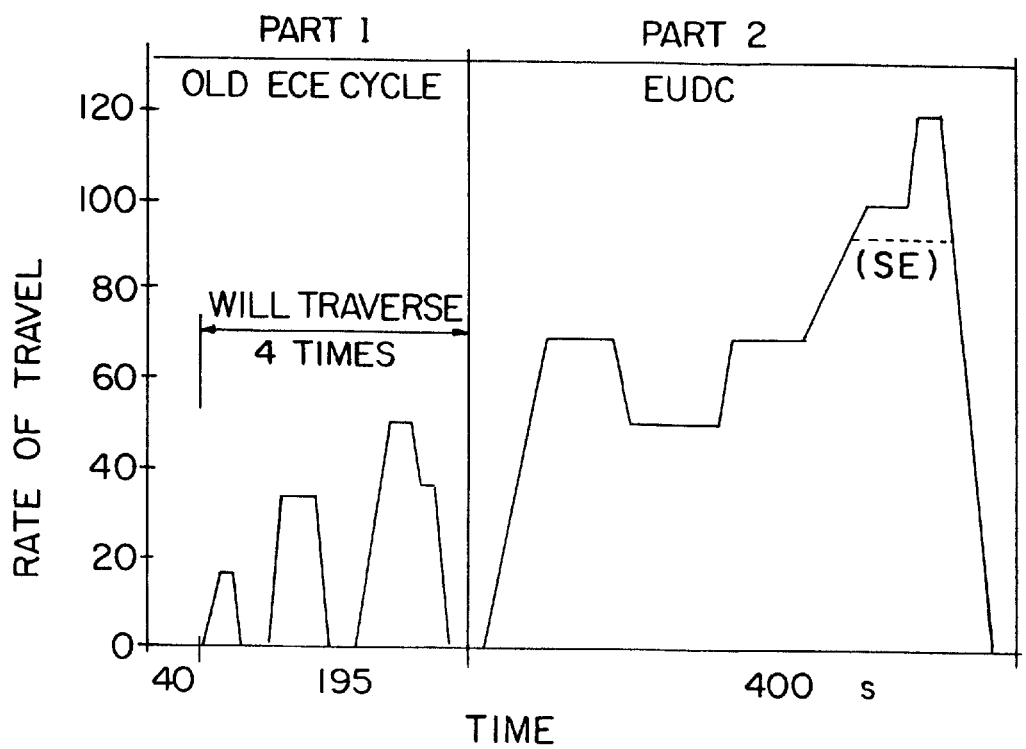
FIG. 2 shows a plot of the driving speed versus time in the European test cycle prescribed at the present time. The duration of the test is 1,220 seconds, and the test distance is about 11 km (total); the average driving speed is about 32.5 km/h, the maximum driving speed is 120 km/h, and the maximum driving speed for vehicles with low-power engines is 90 km/h. The first part of the test cycle, which corresponds to city driving up to 50 km/h, is traversed four times. Frequent acceleration and deceleration phases occur both in this city driving and in the following country road or autobahn operation (EUDC, Extra-Urban Driving Cycle). Besides these, the first few minutes of the cycle contribute especially to the integrated pollutant emission.
Figure 3:
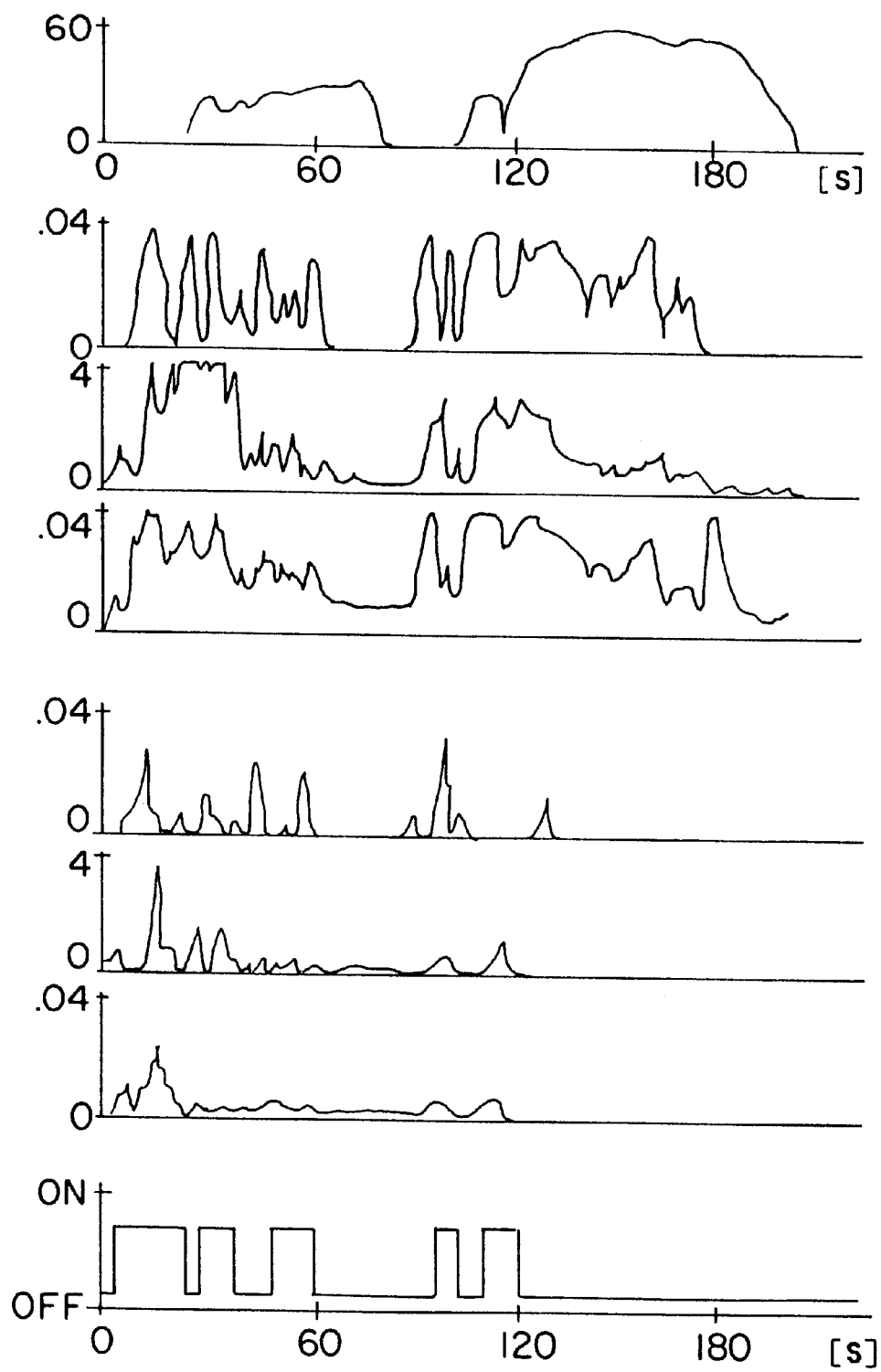
FIG. 3 at the top shows a similar speed curve for the American test cycle. The six curves below this each show a measured emission curve for nitrogen oxides, carbon monoxide, and hydrocarbons, or $NO_x$, CO, and HC emissions, each as a function of time. The first three emission diagrams contain curves with the untreated emissions from the engine. The three following diagrams in turn show curves of emissions that are still present as remaining pollutants beyond the catalyst. The curves in turn serve as the time curves of $NO_x$, CO, and HC emissions, again in g/sec. Very advanced $\lambda$ regulation is already used for the catalyst. While the untreated emissions fluctuate severely during the entire time of the test, the aftertreated exhaust gas contains larger amounts of pollutants practically only at the beginning of the cycle. The later emission peaks can be correlated with load changes that are caused by the running curve or by shift points of the transmission. It is apparent from the number and duration of the peaks that an additional device has to be inserted for the electrical exhaust gas aftertreatment only for a small portion of the time of operation (in this case about 10–15%) and during warmup for about 30 seconds (at the very bottom).
Figure 4:
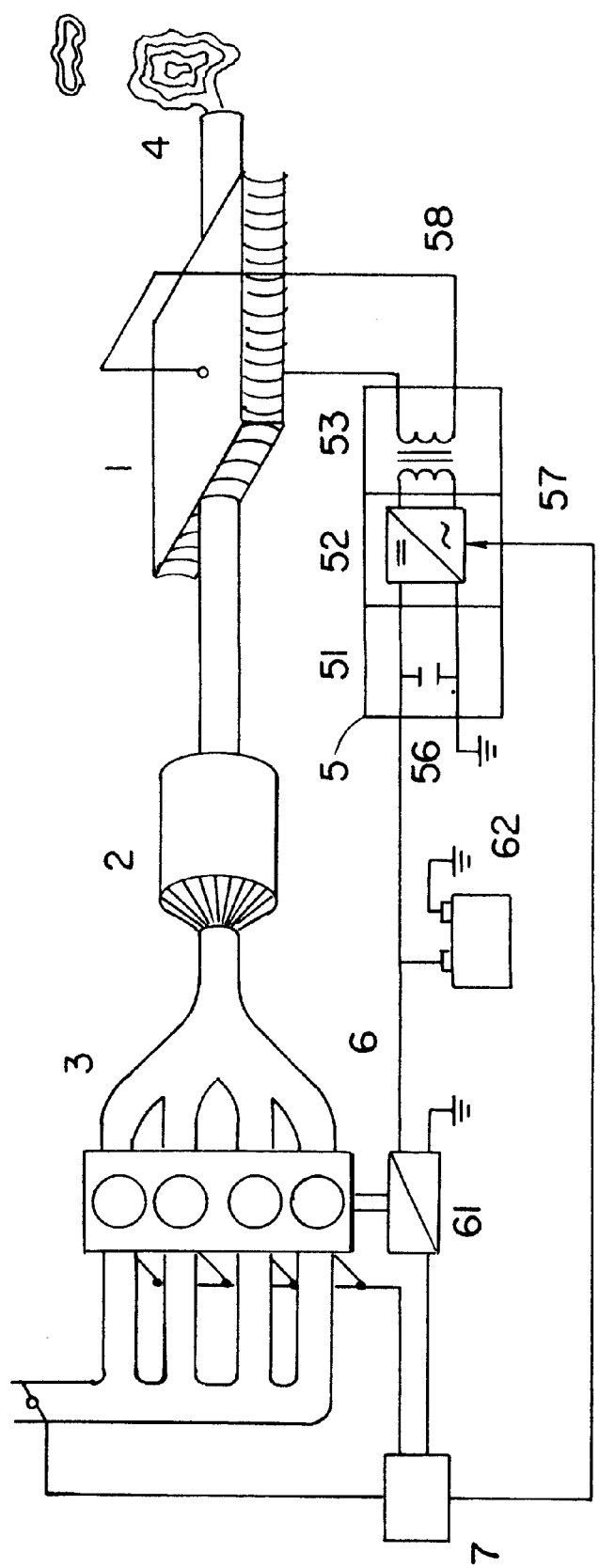

FIG. 4 shows the entire system for the aftertreatment of exhaust gas and its integration into the exhaust line and the electrical system of a motor vehicle.

DESCRIPTION OF THE PREFERRED EMBODIMENT

Referring to FIG. 4, it will be seen the inventive method and device include a plasma chemical reactor (1), which can be integrated, for example, into the exhaust line before the tailpipe (4) in place of a muffler. Additionally, a catalyst (2), for example an oxidation catalyst or a 3-way catalyst made of noble metal or a $DeNO_x$ catalyst for selective catalytic reduction (SCR) can be located in the exhaust line before the reactor (1) and beyond the exhaust manifold (3), as illustrated, or beyond the plasma chemical reactor. The alternating voltage is generated by an electronic power supply unit (5) that includes buffering of the operating voltage (51), a final stage with freely controllable power electronics (52), and a high-voltage transformer (53). The electronic power supply unit (5) has a power connector (56) for the power supply (6) from the generator (61) and/or the automobile battery (62), a control input (57) from the engine electronics system (7), and a high-voltage output (58) for connection to the reactor (1). Alternatively, the entire electronic power supply unit (5) or at least the buffer (51) and the control circuit (52) for the high-voltage final stage (53) can be combined with the engine electronics (7) in one structural component. The remaining final stage (53) is extremely compact and for its part, it can also be combined with the reactor (1) in one structural component.

To reduce fuel consumption and for the reduction of $CO_2$ emission this brings about, an internal combustion engine can be run largely at the optimal operating point for the engine even in non-steady-state operation and during the warmup phase. The brief elevation of the pollutant level in the untreated exhaust gas that goes along with this is knowingly accepted, since there is a device in the exhaust line for the aftertreatment of the exhaust gas. In particular, an electrical discharge that causes decomposition of the pollutants is triggered during the brief time of elevated untreated emission. Since the cold start and non-steady-state phases constitute by far the major portion of the total emission of a test cycle and also of actual operation, a significant reduction of pollutants can be achieved while saving fuel at the same time. This achieves a process for the low-pollution operation of an internal combustion engine that is adapted to transient operation, on the one hand, and on the other hand does not need to have the drawbacks with regard to fuel consumption that are familiar with other processes.

What is claimed is:

1. A process for operating an internal combustion engine with less pollutant emission, whose exhaust gas is subject to an electrical aftertreatment during engine operation to convert pollutants, the emissions of which are measured, wherein the electrical aftertreatment of the exhaust gas occurs only for portions of operating time during warmup and during load change of the engine, and only during times in which emission peaks occur, and wherein the electrical aftertreatment is adapted to be turned on as soon as the starter is actuated, at the beginning of fuel injection.

2. The process pursuant to claim 1, wherein the electrical aftertreatment is turned on immediately after a cold start.

3. The process pursuant to claim 1, wherein the electrical aftertreatment is adapted to be turned on when a load on the engine increases and suddenly decreases.

4. The process pursuant to claim 1, wherein an emission curve is measured according to engine type and to characteristics of the application of the electrical aftertreatment to the exhaust gas.

5. The process pursuant to claim 4, wherein the emission curve is measured during the operating time of the engine and is used during the operating time of the engine for the application of the electrical aftertreatment to the exhaust gas.

6. The process pursuant to claim 1, wherein the operating parameters of the internal combustion engine are set optimally for reducing fuel consumption and for power generation during the electrical aftertreatment of the exhaust gas from the engine.

7. A process for operating an internal combustion engine with less pollutant emission, whose exhaust gas is subject to an electrical aftertreatment during engine operation to convert pollutants, the emissions of which are measured, wherein the electrical aftertreatment of the exhaust gas occurs only for portions of operating time during warmup and during load change of the engine, and only during times in which emission peaks occur, and wherein the electrical aftertreatment is a barrier discharge excited at a frequency between about 500 Hz and about 500 kHz with an alternating voltage that comprises one of sinusoidal, rectangular and narrow pulse-shaped signals.

8. The process pursuant to claim 7 wherein the electrical aftertreatment comprises the alternating voltage which is turned on and off at time intervals of between a few microseconds and a few tens of seconds so as to blank out electrical discharge when said voltage is turned off.

9. The process pursuant to claim 8, wherein the frequency, the voltage and the blanking of the discharge are regulated by means of predetermined stored characteristics.

10. The process pursuant to claim 7, wherein instantaneous power of the discharge is regulated by adjusting the frequency of the alternating voltage.

11. The process pursuant to claim 7, wherein the electrical discharge occurs during warmup of the engine for a period of about 20 to about 40 seconds.

12. The process pursuant to claim 7, wherein the electrical aftertreatment of the exhaust gas occurs only when the emission peaks exceed a selected pollutant level.

13. A process for operating an internal combustion engine with less pollutant emission, whose exhaust gas is subject to an electrical aftertreatment during engine operation to convert pollutants, the emissions of which are measured, wherein the electrical aftertreatment of the exhaust gas occurs only for portions of operating time during warmup and during load change of the engine, and only during times in which emission peaks occur, and wherein the electrical aftertreatment comprises electrical discharges and each electrical discharge occurs for less than about 10 to about 20 seconds following each load change.

14. A device for low-pollution operation of an internal combustion engine having an exhaust line, and a chemical reactor in communication with the exhaust line, the device comprising means for generating electrical discharges in the exhaust gas, the means for generating electrical discharges having a power connection (56) to a generator (61) and a battery (62) for a power supply, the device further comprising a regulator means from which the beginning, the end, the frequency, the energy, and characteristics of the electrical discharges can be regulated, wherein the regulator is adapted to execute regulation of characteristics of the electrical discharges when the internal combustion engine is operating, during a warmup and during a load change of the engine, and only in conjunction with the occurrence of emission peaks, and wherein the electrical discharges are excited at a frequency of between about 500 Hz to about 500 kHz, with an alternating voltage comprising one of sinusoidal, rectangular, and narrow pulse-shaped signals.

15. The device pursuant to claim 14, wherein the chemical reactor (1) is connected to a power supply unit (5) that supplies electricity to the chemical reactor (1) and is combined with an engine electronics unit of the internal combustion engine in a subassembly.

16. The device pursuant to claim 15, wherein the chemical reactor (1) is arranged with a high-voltage final stage (53) in a subassembly located in the exhaust gas line in place of a muffler.

\* \* \* \* \*